US012205316B2

United States Patent
Suzuki et al.

(10) Patent No.: US 12,205,316 B2
(45) Date of Patent: Jan. 21, 2025

(54) AMBIENT ILLUMINANCE SENSOR SYSTEM

(71) Applicant: Microsoft Technology Licensing, LLC, Redmond, WA (US)

(72) Inventors: Nobuyuki Suzuki, Kirkland, WA (US); Samu Matias Kallio, Redmond, WA (US); Ruidong Zhu, Redmond, WA (US); Wenjie Shi, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 17/244,510

(22) Filed: Apr. 29, 2021

(65) Prior Publication Data

US 2022/0351402 A1 Nov. 3, 2022

(51) Int. Cl.
*G06T 7/70* (2017.01)
*G06T 5/20* (2006.01)
*G06T 5/70* (2024.01)
*H04N 23/71* (2023.01)

(52) U.S. Cl.
CPC .................. *G06T 7/70* (2017.01); *G06T 5/20* (2013.01); *G06T 5/70* (2024.01); *H04N 23/71* (2023.01); *G06T 2207/10048* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 7,423,383 B2 * | 9/2008 | Kawano | G09G 5/14 345/84 |
| 7,639,218 B2 | 12/2009 | Lee et al. | |
| 9,330,606 B2 | 5/2016 | Barnhoefer et al. | |
| 9,530,362 B2 | 12/2016 | Chen et al. | |
| 9,823,117 B2 * | 11/2017 | Wieser | G01J 1/16 |
| 10,331,207 B1 * | 6/2019 | Simmons | H04N 13/344 |
| 11,350,059 B1 * | 5/2022 | Swierk | G06N 3/084 |

(Continued)

FOREIGN PATENT DOCUMENTS

CN 108831388 A 11/2018

OTHER PUBLICATIONS

"International Search Report & Written Opinion issued in PCT Application No. PCT/US22/023752", Mailed Date: Jun. 3, 2022, 18 Pages.

(Continued)

*Primary Examiner* — Randolph I Chu
(74) *Attorney, Agent, or Firm* — Holzer Patel Drennan

(57) ABSTRACT

The ambient illuminance sensor system disclosed herein includes a light sensor to generate a series of ambient illuminance values from an area surrounding a computing device, a human presence sensor configured to detect presence of a human in vicinity of the computing device, and computer implemented instructions for determining ambient illuminance level (AIL) based on at least in part on the series of ambient illuminance values, determining presence of a human in vicinity of the light sensor, and based on at least in part on determining that the AIL is below a threshold and that a human is present, applying a hysteresis filter to process the series of ambient illuminance values.

20 Claims, 6 Drawing Sheets

(56) References Cited

U.S. PATENT DOCUMENTS

| | | | |
|---|---|---|---|
| 2008/0054159 A1* | 3/2008 | Yu | G01J 1/4204 250/205 |
| 2010/0207886 A1* | 8/2010 | Ryu | G06F 1/3215 345/166 |
| 2012/0218282 A1 | 8/2012 | Choboter et al. | |
| 2013/0021308 A1* | 1/2013 | Ge | G09G 3/3406 345/207 |
| 2013/0076712 A1 | 3/2013 | Zheng et al. | |
| 2013/0328842 A1* | 12/2013 | Barnhoefer | G06F 3/0443 345/207 |
| 2016/0240167 A1 | 8/2016 | Breazile et al. | |
| 2017/0045936 A1* | 2/2017 | Kakapuri | G06F 3/04847 |
| 2017/0084251 A1* | 3/2017 | Zheng | H03M 1/38 |
| 2019/0098748 A1* | 3/2019 | Guo | G06F 1/1688 |
| 2020/0011518 A1* | 1/2020 | Ko | H01L 25/167 |
| 2020/0227004 A1 | 7/2020 | Zuo et al. | |
| 2021/0109198 A1* | 4/2021 | Hamlin | G01S 7/4817 |
| 2021/0248978 A1* | 8/2021 | Kim | G09G 5/10 |
| 2022/0180798 A1* | 6/2022 | Karivaradaswamy | H04N 5/232411 |
| 2022/0214852 A1* | 7/2022 | Kim | G09F 9/30 |
| 2022/0382335 A1* | 12/2022 | Suzuki | G06F 1/1694 |
| 2023/0042254 A1* | 2/2023 | Sakaguchi | G01S 7/4863 |

OTHER PUBLICATIONS

Backlight and Smart Lighting Control by Ambient Light and Noise-Immune Proximity Sensor Reference Design, Retrieved from: https://www.ti.com/lit/ug/tidub42b/tidub42b.pdf?ts=1614756407974&ref_url=https%253A%252F%252Fwww.google.com%252F, Dec. 2015, pp. 1-40.

* cited by examiner

_AMBIENT ILLUMINANCE SENSOR SYSTEM_

BACKGROUND

Computing devices with displays may use a light sensor to trigger an adjustment of the brightness of the display. For example a computing device such as a laptop, a tablet device, a mobile phone, etc., may include a light sensor that senses the ambient light and provide the information about the ambient illuminance to a processor of the computing device. The processor may use the information about the ambient illuminance to change one or more parameter controlling a display of the computing device. For example, of the information about the ambient illuminance indicates low level of illuminance, the brightness to a processor of a laptop, the processor may increase the brightness of the screen by increasing common voltage or other input provided to illuminate pixels of an LCD screen.

SUMMARY

The ambient illuminance sensor system disclosed herein includes a light sensor to generate a series of ambient illuminance values from an area surrounding a computing device, a human presence sensor configured to detect presence of a human in vicinity of the computing device, and computer implemented instructions for determining ambient illuminance level (AIL) based on at least in part on the series of ambient illuminance values, determining presence of a human in vicinity of the light sensor, and based on at least in part on determining that the AIL is below a threshold and that a human is present, applying a hysteresis filter to process the series of ambient illuminance values.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
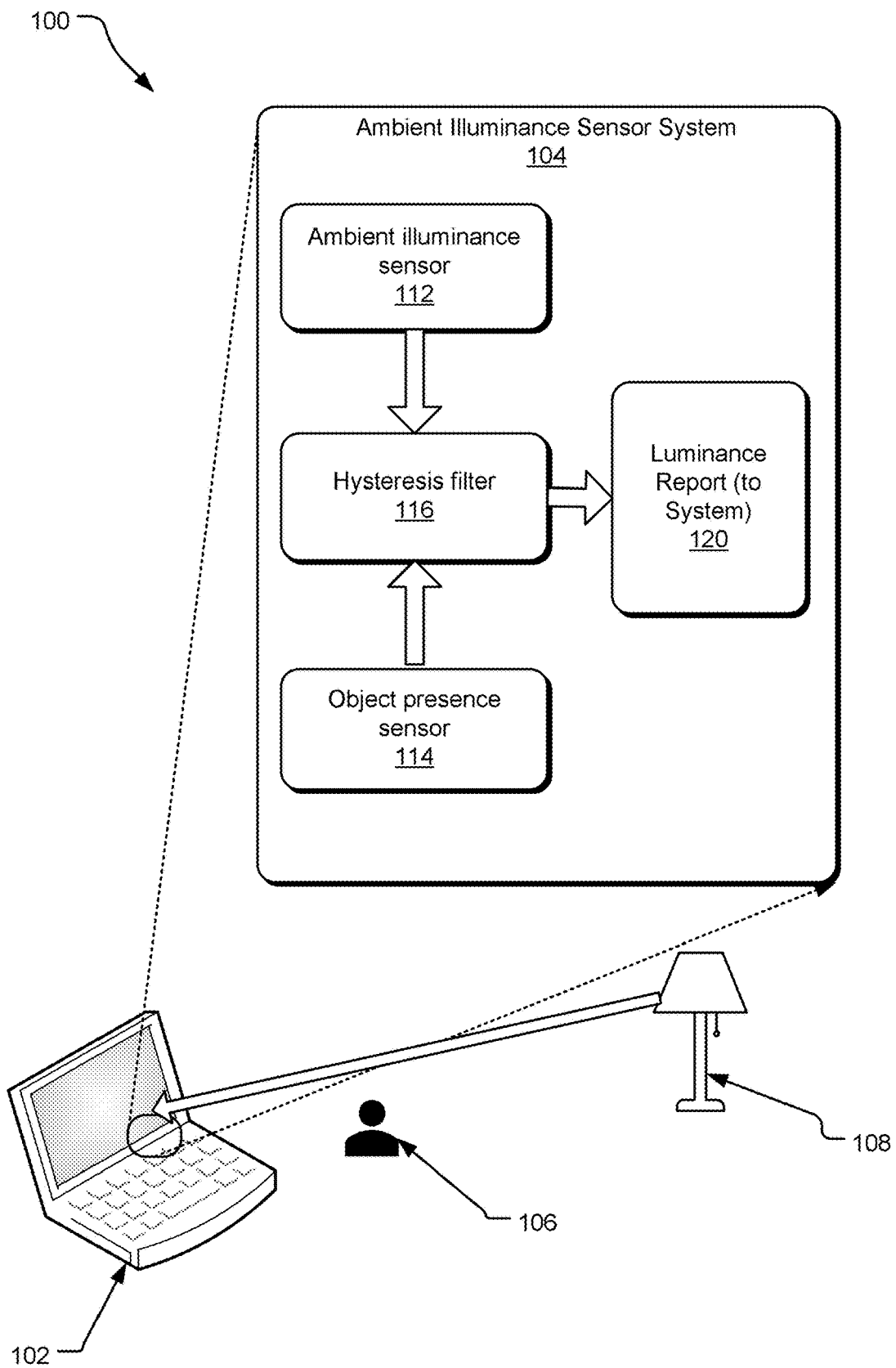
FIG. 1 illustrates an example block diagram of an ambient illuminance sensor system disclosed herein.

Computing devices are used by users in all kinds of different environments. For example, users use laptops, PCs, tablet devices, cellular phones, or other computing devices in various different environments such as offices, conference rooms, homes, at restaurants and coffee shops, outdoor venues, etc. Some environments where the computing devices are used have isotropic illuminance levels such that the level of ambient illuminance does not vary substantially over time or that the rate of change in the ambient illuminance is substantially low. For example, when a user is in a brightly lit office with a computing device, there are multiple sources of light so that the illuminance levels of light incident on the computing device is substantially steady or consistent. Specifically, in such environment, even if the user of the computing device, or any other human or object in the vicinity of the computing device, moves, there is not a significant change in the illuminance levels of light incident on the computing device. In such environment, the operating system of the computing device can determine various operating parameters of the computing device, such as brightness of the screen, the contrast level of the screen, etc., using the ambient illuminance report generated by a light sensor of the computing device.

Compared to that, some environments where the computing devices are used may have anisotropic illuminance levels in the vicinity of the computing device. For example, if a user is working on a laptop at home with only one source of light—for example a lamp behind the user—any human movement may cause significant change in the illuminance levels in the vicinity of the computing device. If the operating system of the computing device uses the ambient illuminance report generated by a light sensor of the computing device in such circumstances, the changes to the ambient illuminance as measured by the light sensor may cause dramatic changes to the operating parameters of the computing device. For example, if the source of light is behind the user and the user moves his head, resulting in rapid changes of the illuminance levels as measured by the light sensor on the computing device, this may result in undesired variations in the brightness, contrast, etc., for the screen of the computing device.

Implementations disclosed herein provides solutions that reduces the impact of movement by humans, or other objects, that may result in rapid changes in the levels of illuminance detected by a computing device. Specifically, the implementations include a light sensor to detect ambient illuminance and a human presence sensor. In one implementation, the light sensor and the human presence sensor are implemented on the computing device, however, alternatively one or both of these sensors may be implemented on a device different than the computing device and communicatively connected to the computing device. Various computing instructions stored on the computing device process the output from the light sensor and the human presence sensor to determine if an hysteresis filter is to be applied to the illuminance signal to reduce variations therein.

The technology disclosed herein solves a technical problem of managing brightness of a computing device screen in presence of variations in illuminance levels surrounding the computing device. Specifically, the technology disclosed herein collects data from an ambient illuminance sensor and compares the ambient illuminance level to a threshold to determine if the ambient illuminance level in the vicinity of the computing device is below a threshold. If the ambient illuminance level is below a threshold, the system analyzes data from a human presence sensor to determine if a human is present in the vicinity of the computing device. Based on at least in part on determining that the ambient illuminance level is below a threshold and that a human is present in the vicinity of the computing device, the system processes an ambient illuminance report using a hysteresis filter with larger hysteresis to generate a sensor report that may be used by an operating system of the computing device. Alternatively, the hysteresis filter may be applied based on change in the ambient illuminance level by a predetermined amount. For example, the operating system of the computing device may use the sensor report to change the voltage applied to pixels on an output screen of the computing device. Furthermore, the performance of the operating system components that revise the common voltage levels (VCO) for the pixels of an output screen of the computing device in response to changes in the ambient light levels also improves when using the ambient light threshold to determine when to adjust the VCO for the pixels.

FIG. 1 illustrates a block diagram of an ambient illuminance sensor system 100 disclosed herein. Specifically, the ambient illuminance sensor system 100 illustrates a computing device 102 being used by a user 106 that receive ambient illuminance from a light source 108. The mobile device 102 may have a an ambient illuminance sensor (AIS) system 104 configured therein. The computing device 102 is illustrated to be a laptop, however, in an alternative implementation, the computing device 102 may be a mobile device, a computer, a tablet, or other computing device. The AIS system 104 may be configured using a number of computer programmable instructions stored on a memory of the computing device 102 where these computer programmable instructions may be executed using a processor of the computing device 102. The AIS system 104 may also have an ambient illuminance sensor 112 that senses the level of ambient illuminance in the vicinity of the computing device 102. Furthermore, the AIS system 104 may also have an object presence sensor 114 that detects presence of an object, such as a human 106 in the vicinity of the computing device 102.

The ambient illuminance sensor 112 may be implemented as any light sensor that measures the level of illuminance in the vicinity of the computing device 102 in lux or other appropriate units. The ambient illuminance sensor 112 may be implemented ambient color sensing capability as well as illuminance. The ambient illuminance sensor 112 may be implemented using a photo-voltaic light sensor, a phototube, a photo-emissive device, a photo-conductive device, a photo-junction device, a light-detective resistor, a photo-diode, a photo-transistor, etc. In one implementation, the ambient illuminance sensor 112 may generate a series of illuminance values measured at a predetermined time period, such as every millisecond (ms), every second, etc. These series of illuminance values may be used by an operating system of the computing device 102 to adjust illuminance levels of an output screen In an alternative implementation, the ambient illuminance sensor 112 may also measure the chromaticity of the ambient light in the vicinity of the computing device 102.

The object presence sensor 114 may use a passive infrared (IR) sensor, an IR camera, a combination of invisible light and its sensor, etc. In one implementation, signals collected by an IR sensor or an IR camera may be processed by the object presence sensor to determine if a human in presence in the vicinity of the computing device 102. The signals received from the ambient illuminance sensor 112 and the IR sensor are processed to determine if a hysteresis filter 116 is to be applied to the series of illuminance signals generated by the ambient illuminance sensor 112. For example, if the illuminance level in the vicinity of the computing device is low and if the object presence sensor 114 determines that a human is presence in the vicinity of the computing device 102, the series of illuminance signals generated by the ambient illuminance sensor 112 may be processed using the hysteresis filter 116.

The hysteresis filter 116 may collect data stream x from the ambient illuminance sensor 112 and generates output data stream y such that y is a non-linear function of the input data stream x. The hysteresis filter 116 may be used to remove impulsive noise in the input data stream x. In one implementation, the hysteresis filter 116 may be configured so that the value of the output does not change until a value of the input changes by a predetermined value. For example, the impulsive noise in the input data stream x generated by the ambient illuminance sensor 112 may be randomly distributed noise of short duration due to movement of human or other objects in the path of the light incident upon the ambient illuminance sensor 112. For example, when the human 106 moves her head, the light incident upon the ambient illuminance sensor 112 from the light source 108 may have random negative or positive impulsive noise spikes. The hysteresis filter 116 may be implemented digitally using computer programmable instructions or using combination of hardware, firmware, and software.

In the illustrated implementation, the computing device 102 and its surrounding area is illuminated by a light source 108. Specifically, as shown, the light source 108 may be a lamp that is located behind the human 106, which may be the user of the computing device 102. As a result of the human 106 being in the path of the illuminance from the light source 108 to the computing device 102, any movement by the human 106 may abruptly change the level of illuminance sensed by the ambient illuminance sensor 112.

Specifically, when the illuminance level in the vicinity of the computing device is low and if a human is presence in the vicinity of the computing device 102, any movement by the human may abruptly change the illuminance level as detected by the ambient illuminance sensor 112. For example, if the human 106 moves their head when the light source 106 is behind them, the change to the illuminance levels at the computing device are exaggerated. The event may more frequently occur when the ambient illuminance levels are low where the ambient light geometry is more anisotropic. In such circumstances, to reduce the impact of such sudden and significant changes in the series of illuminance values reported to the operating system of the computing device 102, they are processed using the hysteresis filter 116 and the resulting series of processed illuminance values are used to generate a illuminance report 120 that may be sent to the system, such as the operating system of the computing device 120.

In one implementation, the ambient illuminance sensor system 104 compares the illuminance values output by the ambient illuminance sensor 112 with a threshold illuminance level to determine if the illuminance in the vicinity of the computing device 102 is low. For example, such a threshold illuminance level may be 100 lux. In one implementation, an average illuminance level, determined based on at least in part on illuminance levels over a predetermined time, may be compared with the threshold illuminance level to determine of the series of illuminance values are to be processed using the hysteresis filter 116. Alternatively, the average illuminance level may be determined based on signals received from other sensors of the computing device, such as a camera or an infra-red sensor. Yet alternatively, the illuminance values output by the ambient illuminance sensor 112 maybe evaluated to see if there is a change in the ambient illuminance level above a predetermined level to determine if a hysteresis filter is to be applied to the illuminance values output by the ambient illuminance sensor 112.

The threshold illuminance level may be predetermined by the computing device 102 at the manufacture level. Alternatively, the threshold illuminance level may be selected by the user of the computing device 102 or periodically adjusted by the user of the computing device 102. In one implementation, the threshold illuminance level may be dynamically adjusted based on an application that is being used on the computing device 102. For example, if an application running on the computing device 102 is highly sensitive to changes in light, such as a design application, the threshold illuminance level may be low. Alternatively, if the computing device is merely using a word processing application that is less sensitive to the changes in ambient illuminance levels, the threshold illuminance level may be high. Changing the threshold illuminance levels dynamically results in improved performance of the operation of display devices by changing, for example, the VCO applied to the pixels of an output screen of a computing device. Specifically, dynamically adjusting the threshold levels may result is better user experience.

The operating system of the computing device 102 may use the illuminance report 120 to determine various parameters of the computing device or its components. For example, the common voltage levels (VCO) for the pixels of an output screen of the computing device 102 may be determined using the illuminance report 120.

Figure 2:
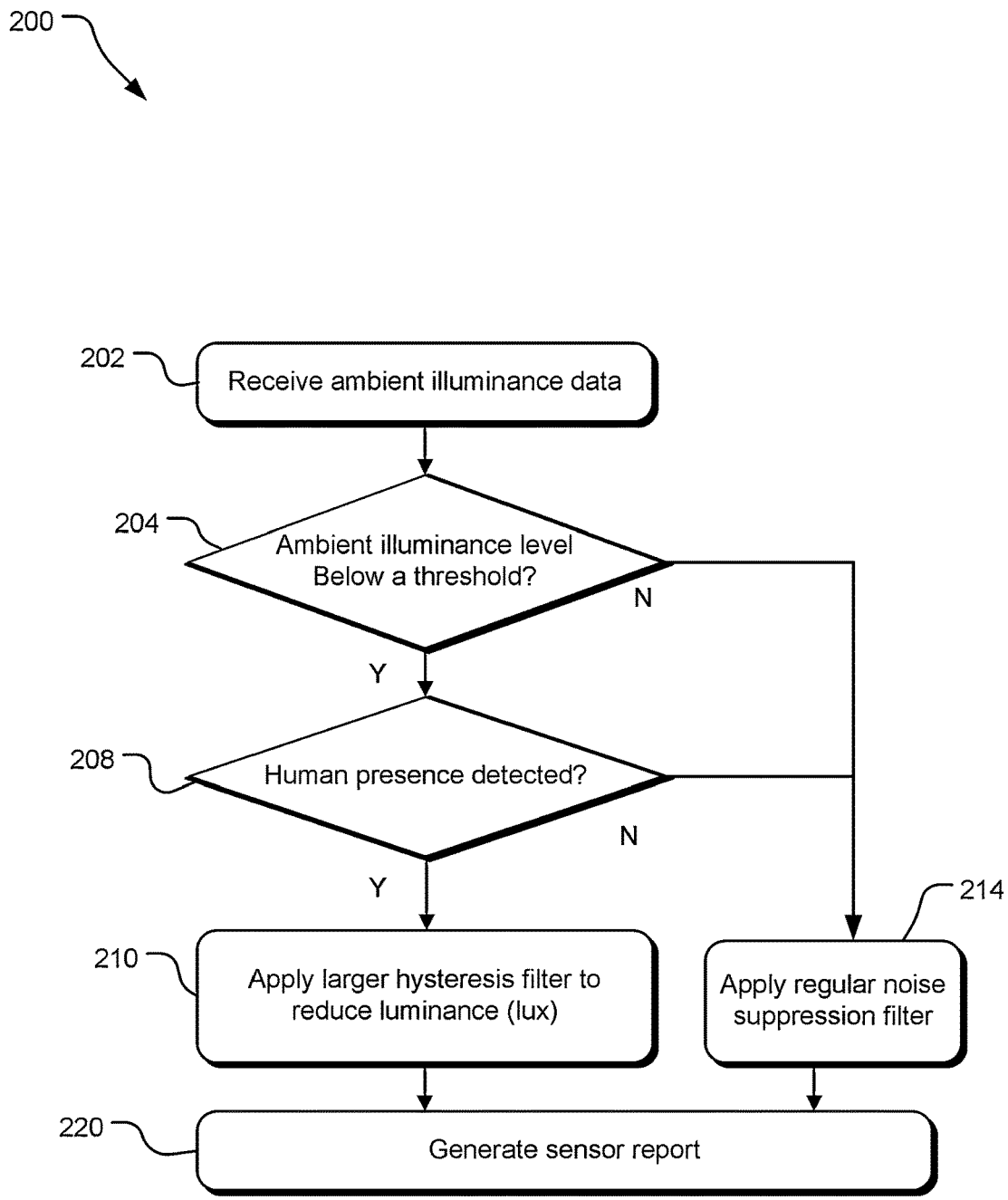
FIG. 2 illustrates example operations for applying a hysteresis filter based on at least in part on ambient illuminance and presence of a human.

Now referring to FIG. 2, it illustrates example operations 200 for applying a hysteresis filter based on ambient illuminance and presence of a human. Specifically, the operations 202 may be implemented on a computing device, such as the computing device 102, to process ambient illuminance values generated by a light sensor to generate a illuminance report to be used by the computing device.

An operation 202 receives ambient illuminance data. The ambient illuminance data may be in the form of a series of illuminance values in lux, each of the illuminance value received generated by an ambient illuminance sensor. For example, ambient illuminance data may be generated at each second by a photovoltaic ambient illuminance sensor. An operation 204 determines if the ambient illuminance level is below a threshold. For example, the ambient illuminance data may be compared to a threshold to determine if the ambient illuminance level is low. In one implementation, an average ambient illuminance level may be generated based on a number of recent illuminance values, such as average lux value based on all illuminance values received in last second, and such average is compared to the threshold to determine if the ambient illuminance is low. Alternatively, the ambient illuminance level may also be determined based on signals received from other sensors of the computing device, such as a camera or an infra-red sensor. Furthermore, such threshold may also be determined dynamically based on various operation parameters of the computing device. For example, if the computing device's remaining battery power is low, the threshold that is compared to the average illuminance value is selected to be lower.

If the operation 204 determines that the ambient illuminance is low, an operation 208 determines whether a human, or another object that may move, is present in the vicinity of the computing device. In one implementation, an object presence sensor, such as an IR object presence sensor may determine if an object or a human is presence in the vicinity of the computing device.

If operation 204 determines that the ambient illuminance is below a threshold and if the operation 208 determines that a human is present in the vicinity of the computing device, than an operation 210 applies a hysteresis filter with larger hysteresis to reduce the variations in the ambient illuminance as measured by the illuminance sensor. Thus, if the ambient illuminance is low as may be the case when the computing device is in a home office being used in evening or night hours and if a human in present, the operation 210 applies such lager hysteresis filter so that the variations in the illuminance data as may be generated by movement of the human do not case larger changes in the parameters such as screen pixel voltage levels, etc.

Alternatively, if the operation 204 determines that the ambient illuminance is not below a threshold or if the operation 208 determines that a human is not present in the vicinity of the computing device, than an operation 214 applies a regular noise reduction filter to the ambient illuminance data. An operation 220 generates a sensor illuminance report based on either the illuminance data output by operation 210 or the illuminance data output by operation 214. Such sensor illuminance report may be provided to an operating system of the computing device for determining values of one or more other operating parameters of the computing device. Thus, using the regular noise reduction filter when the human presence is not detected provides better system performance by reducing unnecessary hysteresis filtering of the noise in the stream of ambient illuminance signals. For example, by not applying the hysteresis filter, necessary changes to the pixel illuminance are applied when the ambient illuminance level has changed.

Figure 3:
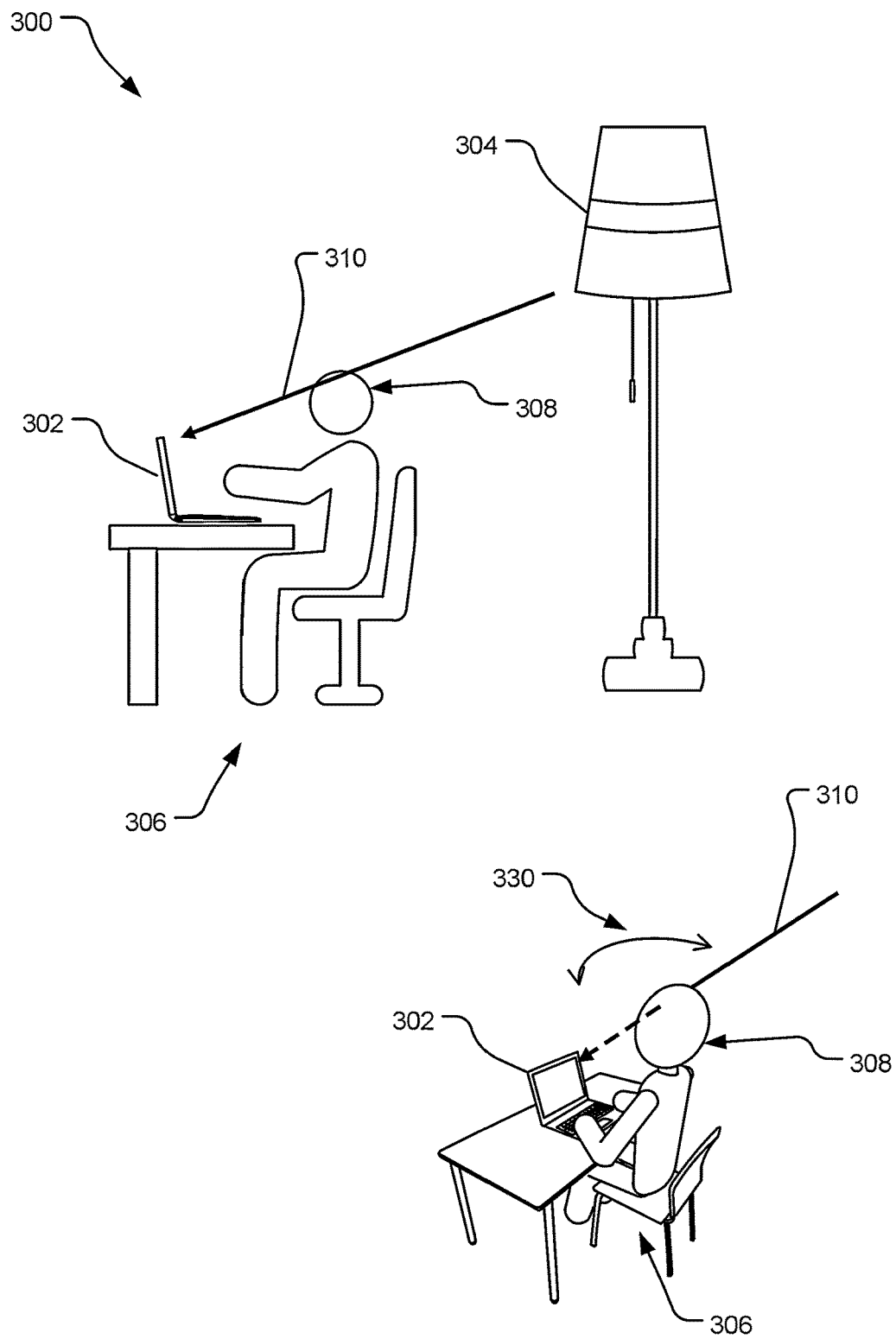
FIG. 3 illustrates example use case indicating use of the an ambient illuminance sensor system disclosed herein.

FIG. 3 illustrates a use case 300 indicating use of the an ambient illuminance sensor system disclosed herein. For example, a user 306 may be using a computing device 302 that is illuminate by a light source 304. As illustrated herein, head 308 of the user 306 may be generally in a path 310 of the light incident upon the computing device 302 from the light source 304. As a result, when the user 306 or her head 308 moves as indicated by 330, such head movement 330 may generate a large change in the illuminance data generated by an illuminance sensor on the computing device 302. Therefore, when presence of the user 306 is also detected by a human presence sensor on the computing device and when the illuminance level is low, a noise filter with higher hysteresis is used to process the illuminance data generated by the ambient illuminance sensor. Subsequently, the data processed by such noise filter with higher hysteresis is used to generate ambient illuminance report.

Figure 4:
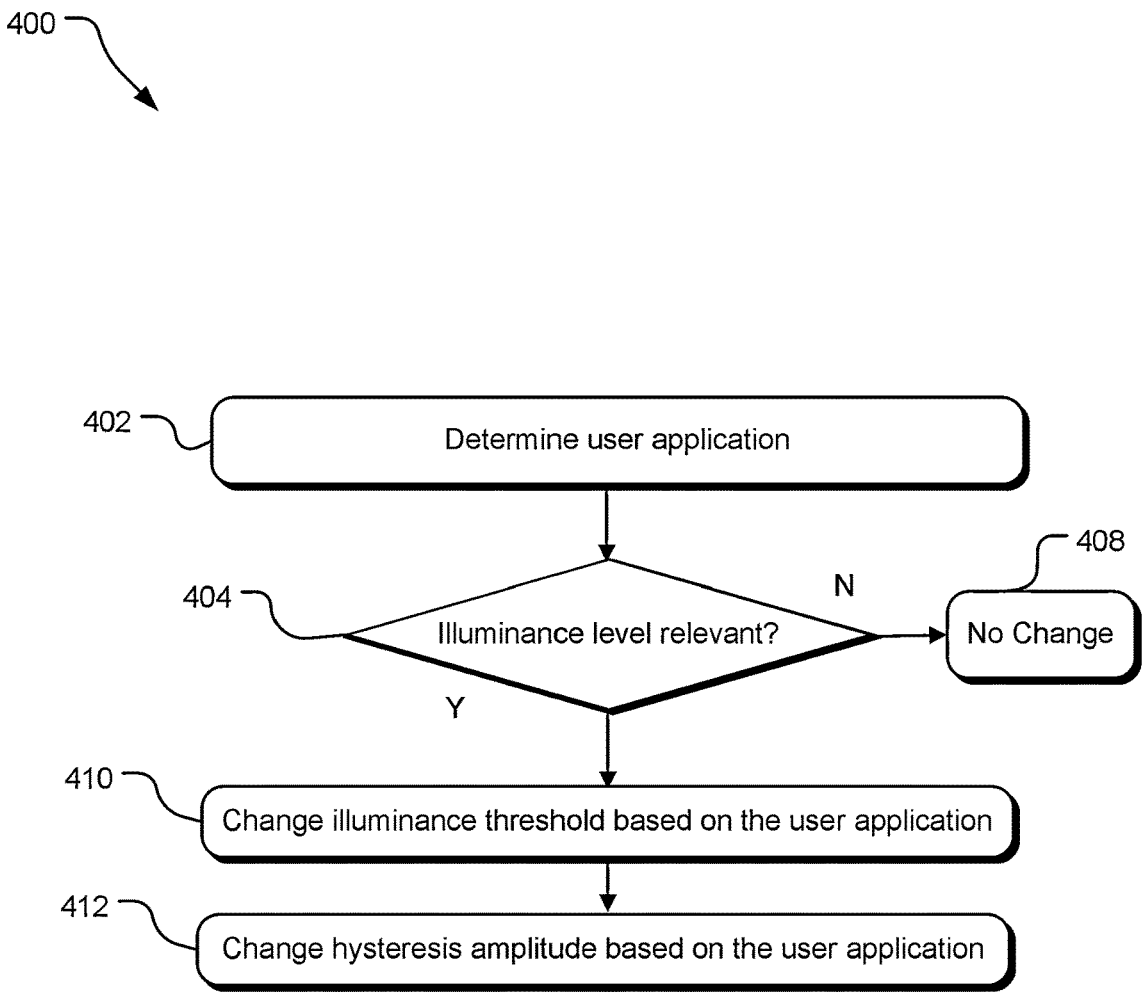
FIG. 4 illustrates example operations for dynamically changing variables of the ambient illuminance sensor system disclosed herein.

Now referring to FIG. 4, it illustrates operations 400 for dynamically changing variables of the ambient illuminance sensor system disclosed herein. An operation 402 determines a user application that is running on the computing device. In one implementation, where more than one applications are running on the computing device, the operation 402 may determine a user application that is predominantly using an output component, such as an output screen of the computing device.

Subsequently, a determining operation 404 determines if the illuminance level is relevant to the output of such user application. For example, if the user is viewing a movie, the illuminance level may not be highly relevant, whereas if the user is using a worksheet, such illuminance level may be highly relevant. If it is determined that the ambient illuminance level is not relevant to the user application using an output screen of the computing device, an operation 408 determines that no change in the threshold is necessary. However, if it is determined that the ambient illuminance level is relevant to the user application using an output screen of the computing device, an operation 410 changes the illuminance threshold based on the user application. The information about the relation between user applications and the relevance of the ambient illuminance to the user application may be predetermined and stored on the computing device or it may be selected by a user. Subsequently, an operation 412 may change the amount of hysteresis amplitude to be used by a noise reduction filter used to process the ambient illuminance data.

Figure 5:
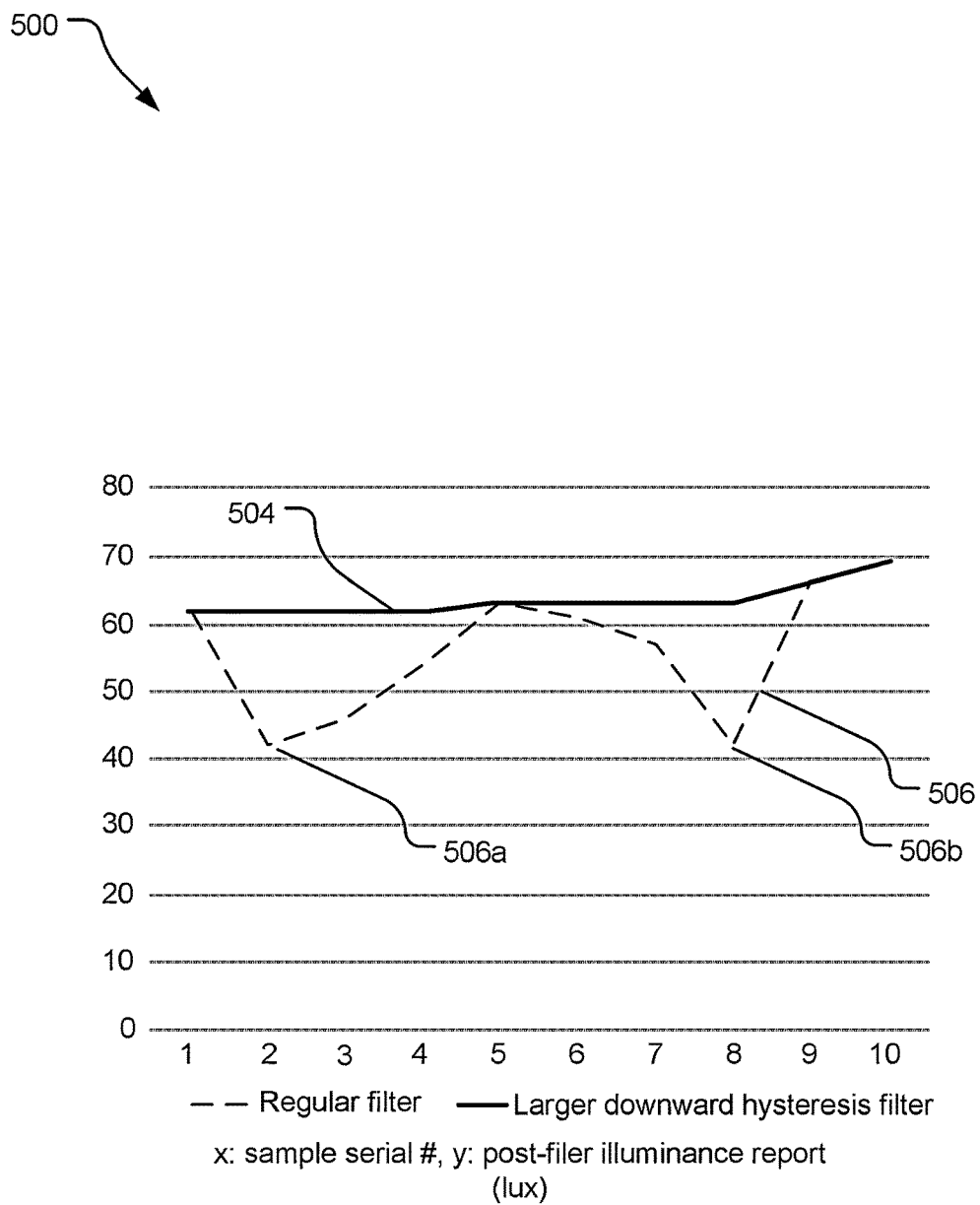
FIG. 5 illustrates an example graph illustrating resulting illuminance reports generated using the ambient illuminance sensor system disclosed herein.

FIG. 5 illustrates a graph 500 illustrating resulting illuminance reports generated using the ambient illuminance sensor system disclosed herein. Specifically, the graph 500 plots illuminance values in lux on the Y-axis as a function of time on the X-axis. Specifically, a line 506 illustrates illuminance data that may be generated as a result of movement of a user, a user's head, a user's hand, etc., in the vicinity of a computing device. For example, at points 506a, 506b, the user's head may have moved in between the light source and the computing device. The impact of such changes in the illuminance values on any decision made by the operating system of the computing device may be exacerbated when the overall illuminance level is low.

The system disclosed herein determines that when the overall illuminance level is low a human is present, the series of illuminance data 506 is processed using a noise filter with higher downward hysteresis, resulting in more smoother series of illuminance data as represented by 504, which is used to generate the illuminance report to be communicated to the operating system of the computing device.

Figure 6:
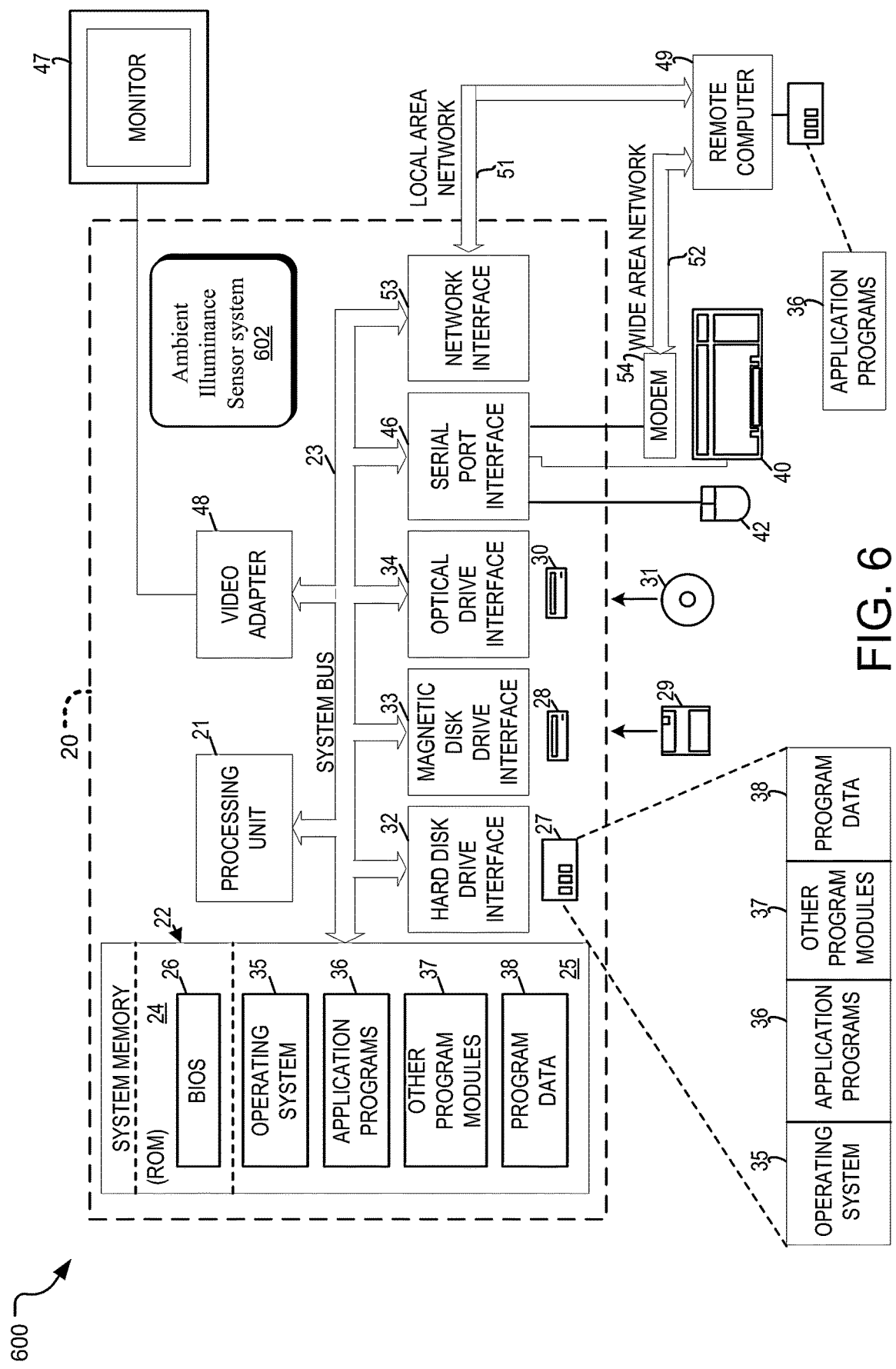
FIG. 6 illustrates an example computing system that may be useful in implementing the described technology.

FIG. 6 illustrates an example system 500 that may be useful in implementing the device capability model sharing system disclosed herein. The example hardware and operating environment of FIG. 7 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for a device capability model sharing system may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, an ambient illuminance sensor system 602 may be implemented on the computer 20 as an application program 36 (alternatively, the ambient illuminance sensor system 602 may be implemented on a server or in a cloud environment). The ambient illuminance sensor system 602 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. On the other hand, tangible computer-readable storage media may not embody only computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

A physical article of manufacture disclosed herein includes one or more tangible computer-readable storage media, encoding computer-executable instructions for executing on a computer system a computer process, the computer process including generating a series of ambient illuminance values based on at least in part on signals received from a light sensor, determining ambient illuminance level (AIL) based on the series of ambient illuminance values, determining presence of an object in vicinity of the light sensor, and based on at least in part on determining that the AIL is below a threshold and that an object is present, applying a hysteresis filter to process the series of ambient illuminance values.

A method disclosed herein includes determining a series of ambient illuminance values using a light sensor, determining ambient illuminance level (AIL) based on at least in part on the series of ambient illuminance values, determining presence of an object in vicinity of the light sensor, and based on at least in part on determining that the AIL is below a threshold and that an object is present, applying a hysteresis filter to process the series of ambient illuminance values.

A system disclosed herein includes a memory, one or more processor units, a light sensor to generate a series of ambient illuminance values from an area surrounding a computing device, a human presence sensor configured to detect presence of a human in vicinity of the computing device, an ambient illuminance report generation system stored in the memory and executable by the one or more processor units, the ambient illuminance report generation system encoding computer-executable instructions on the memory for executing on the one or more processor units a computer process, the computer process including determining ambient illuminance level (AIL) based on at least in part on the series of ambient illuminance values, determining presence of a human in vicinity of the light sensor, and based on at least in part on determining that the AIL is below a threshold and that a human is present, applying a hysteresis filter to process the series of ambient illuminance values.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more tangible computer-readable storage media, encoding computer-executable instructions for executing on a computer system a computer process, the computer process comprising:

generating a series of ambient illuminance values based on at least in part on signals received from a light sensor;

determining ambient illuminance level (AIL) based on the series of ambient illuminance values;

determining presence of an object in vicinity of the light sensor;

based on at least in part on determining that the AIL is below a threshold and that an object is present, applying a hysteresis filter to process the series of ambient illuminance values; and changing common voltage levels (VCO) of pixels on a screen of a computing device based at least on the ambient illuminance values.

2. The physical article of manufacture of claim 1, wherein the computer process further comprising applying a regular noise suppression filter to the series of ambient illuminance values based on at least in part on determining that the AIL is not below the threshold.

3. The physical article of manufacture of claim 1, wherein applying a hysteresis filter to process the series of ambient illuminance values further comprising reducing the amplitude changes in the series of ambient illuminance values.

4. The physical article of manufacture of claim 1, wherein the computer process further comprising determining the threshold based on a type of application running being used by a user of a computing device including the light sensor.

5. The physical article of manufacture of claim 1, wherein the computer process further comprising generating an illuminance report including a stream of temporal values of lux/unit area in the vicinity of a computing device including the sensor.

6. The physical article of manufacture of claim 1, wherein determining presence of an object further comprises determining presence of a human.

7. The physical article of manufacture of claim 6, wherein determining presence of a human further comprises determining presence of the human by analyzing an image captured by an infra-red camera.

8. The physical article of manufacture of claim 6, wherein determining presence of a human further comprises determining presence of the human by analyzing a signal captured by an infra-red sensor.

9. The physical article of manufacture of claim 3, wherein applying a hysteresis filter to process the series of ambient illuminance values further comprising determining the amount of amplitude changes in the series of ambient illuminance values based on a type of application running being used by a user of a computing device including the light sensor.

10. A method, comprising:
   determining a series of ambient illuminance values using a light sensor;
   determining ambient illuminance level (AIL) based on at least in part on the series of ambient illuminance values;
   based on at least in part on determining that the AIL is bellow a threshold, determining presence of an object in vicinity of the light sensor;
   based on at least in part on determining that the AIL is below a threshold and that an object is present, applying a hysteresis filter to process the series of ambient illuminance values; and
   changing common voltage levels (VCO) of pixels on a screen of a computing device based at least on the ambient illuminance values.

11. The method of claim 10, wherein applying a hysteresis filter to process the series of ambient illuminance values further comprising reducing the amplitude changes in the series of ambient illuminance values.

12. The method of claim 10, further comprising determining the threshold based on a type of application running being used by a user of a computing device including the light sensor.

13. The method of claim 10, further comprising generating an illuminance report including a stream of temporal values of lux/unit area in the vicinity of a computing device including the sensor.

14. The method of claim 10, wherein determining presence of an object further comprises determining presence of a human.

15. The method of claim 14, wherein determining presence of a human further comprises determining presence of the human by one of analyzing an image captured by an infra-red camera and analyzing a signal captured by an infra-red sensor.

16. The method of claim 11, wherein applying a hysteresis filter to process the series of ambient illuminance values further comprising determining the amount of amplitude changes in the series of ambient illuminance values based on a type of application running being used by a user of a computing device including the light sensor.

17. A system, comprising:
   memory;
   one or more processor units;
   a light sensor to generate a series of ambient illuminance values from an area surrounding a computing device;
   a human presence sensor configured to detect presence of a human in vicinity of the computing device;
   an ambient illuminance report generation system stored in the memory and executable by the one or more processor units, the ambient illuminance report generation system encoding computer-executable instructions on the memory for executing on the one or more processor units a computer process, the computer process comprising:
   determining ambient illuminance level (AIL) based on at least in part on the series of ambient illuminance values;
   determining presence of a human in vicinity of the light sensor; and
   based on at least in part on determining that the AIL is below a threshold and that a human is present, applying a hysteresis filter to process the series of ambient illuminance values; and
   changing common voltage levels (VCO) of pixels on a screen of a computing device based at least on the ambient illuminance values.

18. The system of claim 17, wherein applying a hysteresis filter to process the series of ambient illuminance values further comprising reducing the amplitude changes in the series of ambient illuminance values.

19. The system of claim 18, wherein applying a hysteresis filter to process the series of ambient illuminance values further comprising determining the amount of amplitude changes in the series of ambient illuminance values based on a type of application running being used by a user of a computing device including the light sensor.

20. The system of claim 17, wherein determining presence of a human further comprises determining presence of the human by one of analyzing an image captured by an infra-red camera and analyzing a signal captured by an infra-red sensor.

* * * * *